United States Patent
Bouwman et al.

[19]

[11] Patent Number: 6,069,454
[45] Date of Patent: May 30, 2000

[54] IGNITION CIRCUIT FOR A DISCHARGE LAMP

[75] Inventors: Lambertus J. M. Bouwman; Arjan Van Den Berg; Rolf E. De Man, all of Eindhoven, Netherlands

[73] Assignee: U.S. Philips Corporation, New York, N.Y.

[21] Appl. No.: 09/141,641

[22] Filed: Aug. 27, 1998

[30]    Foreign Application Priority Data

Sep. 1, 1997  [EP]  European Pat. Off. .............. 97202683

[51] Int. Cl.$^7$ .................................................. H05B 37/02
[52] U.S. Cl. ...................... 315/209 R; 315/224; 315/244
[58] Field of Search .................................... 315/224, 244, 315/209 R, 219, 291, DIG. 5

[56]               References Cited

U.S. PATENT DOCUMENTS 5,343,125  8/1994  Bernitz et al. ........................... 315/245
5,677,602  10/1997  Paul et al. ............................... 315/224

*Primary Examiner*—David H. Vu
*Attorney, Agent, or Firm*—Bernard Franzblau

[57]               ABSTRACT

A circuit arrangement for supplying a discharge lamp with a direct current includes input terminals for connection to a supply voltage source. A circuit portion (I) is coupled to the input terminals for generating a DC voltage from the supply voltage and is provided with output terminals between which the DC voltage is present during operation. A first branch comprising a first capacitor interconnects the output terminals and a second branch comprising a series arrangement of a second capacitor and an impedance shunts the first branch. A load branch shunts the series arrangement and comprises terminals for connecting a discharge lamp. The second branch also includes a diode so that a discharge lamp operated by way of the circuit arrangement stabilizes satisfactorily after ignition by a current supplied by the second capacitor to the lamp via the impedance.

18 Claims, 1 Drawing Sheet

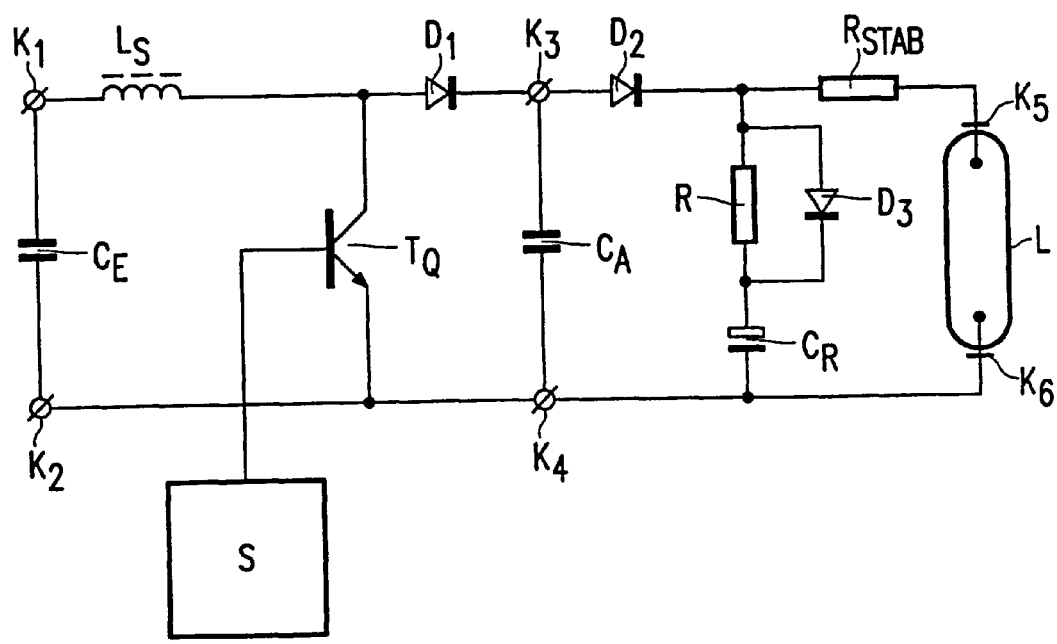

IGNITION CIRCUIT FOR A DISCHARGE LAMP

BACKGROUND OF THE INVENTION

This invention relates to a circuit arrangement for supplying a discharge lamp with a direct current, provided with
- input terminals for connection to a supply voltage source,
    - a circuit portion I coupled to the input terminals for generating a DC voltage from the supply voltage delivered by the supply voltage source,
    - said circuit portion being provided with output terminals between which the DC voltage is present during operation,
- a first branch comprising capacitive means and interconnecting the output terminals,
- a second branch comprising a series arrangement of second capacitive means and an impedance and shunting the first branch, and
- a first terminal for holding the discharge lamp connected to a first end of the series arrangement and a second terminal for holding the discharge lamp connected to a second end of the series arrangement.

Such a circuit arrangement is known from patent document U.S. Pat. No. 5,343,125. The impedance present in the second branch is formed by an ohmic resistor in the known circuit arrangement. The first capacitive means serve as an output buffer capacitor. Immediately after ignition of a discharge lamp connected to the known circuit arrangement, the discharge is not yet stable and the impedance of the discharge lamp is comparatively low. The first capacitive means deliver a first current having a comparatively high amplitude to the load during a comparatively short time interval immediately after ignition. At the same time, the second capacitive means deliver a second current to the load. However, since the amplitude of the second current is limited by the impedance formed by the ohmic resistor and present in the second branch, the second current will flow during a considerably longer time interval. Given a suitable dimensioning of the known circuit arrangement, the second current has a sufficiently high amplitude and also flows long enough for maintaining the discharge in the discharge lamp immediately after ignition for so long as is necessary for this discharge to stabilize itself. It is thus achieved in the circuit arrangement that a discharge lamp operated by means of the circuit arrangement has a good ignition behavior. The voltage across the discharge lamp is comparatively low while the discharge is stabilizing during a first time interval immediately after ignition. During the last stage of the stabilizing process of the discharge, however, the voltage across the lamp rises to the value belonging to stationary lamp operation. An important disadvantage of the known circuit arrangement however, is that a considerable portion of the current supplied by the second capacitive means does not flow to the discharge lamp but to the first capacitive means when the voltage across the discharge lamp rises during this last stage. The current supplied by the second capacitive means flows both through the discharge lamp and through the first capacitive means as the lamp voltage rises, which means that the second branch operates comparatively inefficiently in this phase of the lamp operation, which may even cause the discharge lamp to extinguish.

SUMMARY OF THE INVENTION

The invention has for an object to provide a circuit arrangement with which the discharge in a discharge lamp operated by means of the circuit arrangement is stabilized in an efficient and effective manner.

A circuit arrangement as described in the opening paragraph is for this purpose characterized in that the second branch is in addition provided with unidirectional means which are connected in series with the second capacitive means and the impedance.

When the voltage across the discharge lamp increases during the last stage in stabilizing the discharge of a discharge lamp operated by means of a circuit arrangement according to the invention, the current supplied by the second capacitive means flows completely through the discharge lamp because the unidirectional means prevent any portion of this current from flowing through the first capacitive means. The current supplied by the second capacitive means is used very efficiently during the stabilization of the discharge because this current flows exclusively through the discharge lamp. It can be prevented thereby that the discharge lamp extinguishes in this last stabilization stage of the discharge.

Preferably the unidirectional means comprise a diode. The unidirectional means are thus realized in a comparatively simple and reliable manner.

Good results are obtained with circuit arrangements according to the invention wherein the circuit portion I comprises a DC-DC converter provided with inductive means, rectifying means, a switching element, and a control circuit coupled to a control electrode of the switching element for rendering the switching element conducting and non-conducting with high frequency. It is possible by means of the DC-DC converter to adjust the voltage between the output terminals to a value which is attuned to the properties of the load during stationary operation.

Preferably, the impedance present in the second branch is shunted by a further unidirectional element. The second capacitive means are charged via this further unidirectional element and not via the impedance present in the second branch before ignition of the discharge lamp. Charging through this further unidirectional element will usually be faster than through the impedance and will be accompanied by less power dissipation. Preferably, the further unidirectional element comprises a diode. This embodiment of the further unidirectional element is comparatively simple and reliable.

Preferably, the impedance present in the second branch comprises an ohmic resistor. The impedance is thus realized in a simple and comparatively inexpensive manner.

BRIEF DESCRIPTION OF THE DRAWING

An embodiment of the invention will be explained in detail with reference to a drawing, in which:

The figure diagrammatically shows an embodiment of a circuit arrangement according to the invention with a discharge lamp connected thereto.

DETAILED DESCRIPTION OF THE PREFERRED EMBODIMENT

In the figure, K1 and K2 are input terminals for connection to a supply voltage source. The input terminals K1 and K2 are interconnected by means of a capacitor C1 which acts as an input buffer. The input terminals K1 and K2 are also interconnected by means of a series arrangement of a coil Ls and a switching element TQ. The switching element TQ is shunted by a series arrangement of a diode D1 and a capacitor CA. A control electrode of the switching element TQ is connected to an output of a control circuit S for rendering the switching element conducting and non-conducting at a high frequency. The coil Ls, the switching element TQ, the diode D1, and the control circuit S together form a DC-DC converter of the upconverter type. The coil Ls in this embodiment forms inductive means, and the diode D1 forms rectifying means. The capacitor CA in this embodiment forms both a first branch and first capacitive means, interconnecting the output terminals K3 and K4. The capacitor CA is shunted by a series arrangement of a diode D2, an ohmic resistor R, and a capacitor CR. The ohmic resistor R is shunted by a diode D3. The diode D2 forms a unidirectional means in this embodiment. The ohmic resistor R, the diodes D2 and D3, and the capacitor CR form a second branch. The ohmic resistor R forms an impedance present in the second branch and the capacitor CR forms a second capacitive means. The diode D3 forms a unidirectional element. The series arrangement of the ohmic resistor R and the capacitor CR is shunted by a load branch which is formed by stabilizer resistor Rstab and terminals K5 and K6 for connecting a discharge lamp. A discharge lamp L is connected to the terminals K5 and K6. The embodiment shown in the figure is suitable for being supplied with a DC voltage.

The operation of the circuit arrangement shown in the figure is as follows.

When the input terminals K1 and K2 are connected to a supply voltage source which delivers a DC voltage, the control circuit S will render the switching element TQ conducting and non-conducting at a high frequency. The capacitors CA and CR are charged thereby (the latter mainly via diode D3). As a result of this, DC voltages of comparatively high amplitude are present across capacitor CA, capacitor CR, and the discharge lamp L. The discharge lamp ignites as a result of the DC voltage of comparatively high amplitude which is present across the discharge lamp. Immediately after ignition of the discharge lamp L, the impedance of the discharge lamp is comparatively low, and a comparatively strong current flows from the capacitor CA through the discharge lamp for a very short period. The voltage across the discharge lamp and the voltage across the capacitor CA assume comparatively low values. A current will also start to flow from the capacitor CR through the discharge lamp L immediately after ignition of the discharge lamp L. This current from the capacitor CR is substantially limited by the resistor R. This has the result that the current from the capacitor CR has a comparatively low amplitude, and accordingly flows for a comparatively long period. In the last stage of the stabilization of the discharge in the discharge lamp, the voltage across the discharge lamp rises to a value belonging to stationary operation. The impedance of the discharge lamp rises at the same time. it is prevented by means of the diode D2 that part of the current delivered by the capacitor CR flows to the capacitor CA in this last stage, so that the full current delivered by the capacitor CR remains utilized for the stabilization of the discharge in the discharge lamp. There is hardly any current flowing through the ohmic resistor R during stationary operation, so that there is hardly any power dissipation in this ohmic resistor R. The discharge is stabilized by the stabilizer resistor Rstab, which serves as a ballast element, during stationary operation of the circuit arrangement.

In a practical embodiment of the circuit arrangement as shown in the figure, the capacitance values chosen for CA and CR were 1 nF and 2.2 nF, respectively. The resistance values of the ohmic resistor R and the stabilizer resistor Rstab were 300 kΩ each. The discharge lamp operated by means of the circuit arrangement was provided with an elongate tubular discharge vessel and a gas filling comprising substantially pure neon. The discharge lamp ignited at a DC voltage having an amplitude of 4.5 kV. Immediately after ignition, the voltage across the discharge lamp dropped to an amplitude of 100 V. This latter value of the voltage across the discharge lamp was maintained for approximately 100 µs. The current through the discharge lamp was approximately 1.5 mA during these 100 µs. After that, the voltage across the discharge lamp rose over a period of approximately 25 µs to the value belonging to stationary lamp operation, i.e. 1400 V. The current consumed by the discharge lamp dropped to a level of approximately 1 mA during this latter time interval.

We claim:

1. A circuit arrangement for supplying a discharge lamp with a direct current, comprising:

input terminals for connection to a supply voltage source,
a circuit portion coupled to the input terminals for generating a DC voltage from the supply voltage delivered by the supply voltage source, said circuit portion having output terminals between which the DC voltage is present during operation,
a first branch comprising capacitive means and interconnecting the output terminals,
a second branch comprising a series arrangement of second capacitive means and an impedance and shunting the first branch, and
a first terminal for connecting the discharge lamp to a first end of the series arrangement and a second terminal for connecting the discharge lamp to a second end of the series arrangement, and wherein the second branch includes unidirectional means connected in series with the second capacitive means and the impedance.

2. A circuit arrangement as claimed in claim 1, wherein the unidirectional means comprises a diode.

3. A circuit arrangement as claimed in claim 2, wherein the circuit portion comprises a DC-DC converter including an inductive element, rectifying means, a switching element, and a control circuit coupled to a control electrode of the stitching element for driving the switching element conducting and non-conducting at a high frequency.

4. A circuit arrangement as claimed in claim 3, wherein the impedance present in the second branch is shunted by a further unidirectional element.

5. A circuit arrangement as claimed in claim 2, wherein the impedance present in the second branch is shunted by a further uinidirectional element.

6. A circuit arrangement as claimed in claim 1, wherein the circuit portion comprises a DC-DC converter including an inductive element, rectifying means, a switching element, and a control circuit coupled to a control electrode of the switching element for driving the switching element conducting and non-conducting at a high frequency.

7. A circuit arrangement as claimed in claim 6, wherein the impedance present in the second branch is shunted by a further unidirectional element.

8. A circuit arrangement as claimed in claim 1, wherein the impedance present in the second branch is shunted by a further unidirectional element.

9. A circuit arrangement as claimed in claim 8, wherein the further unidirectional element comprises a diode.

10. A circuit arrangement as claimed in claim 1, wherein the impedance present in the second branch comprises an ohmic resistor.

11. A power supply circuit for a discharge lamp comprising:

first and second input terminals for connection to a source of operating voltage for the power supply circuit, an inverter circuit coupled to said input terminals for generating at first and second output terminals thereof a DC voltage, a first capacitor connected across said first and second output terminals of the inverter circuit, a series circuit comprising a current rectifier, an impedance element and a second capacitor connected across said first and second output terminals in parallel with the first capacitor, and first and second discharge lamp connection terminals connected to said inverter circuit first and second output terminals via said current rectifier.

12. The power supply circuit as claimed in claim 11 further comprising a second current rectifier directly connected in parallel with the impedance element.

13. The power supply circuit as claimed in claim 12 wherein the first and second rectifiers are polarized in the same direction relative to the DC voltage at said inverter circuit first and second output terminals, and further comprising a ballast element connected in series with the first and second lamp connection terminals.

14. The power supply circuit as claimed in claim 12 further comprising a ballast element connected in series with the first and second lamp connection terminals and in shunt with the series combination of the impedance element and the second capacitor.

15. The power supply circuit as claimed in claim 11 wherein said first and second input terminals are adapted for connection to a source of DC operating voltage and the inverter circuit comprises a DC/DC converter including an inductor and a second rectifier serially connected between the first input terminal and the first output terminal, a transistor switch coupled between the second input terminal and a junction point between the inductor and second rectifier, and a control circuit coupled to a control electrode of the transistor switch so as to alternately and periodically turn the transistor switch on and off at a high frequency.

16. The power supply circuit as claimed in claim 11 further comprising a ballast element connected in series with the first and second lamp connection terminals and in shunt with the series combination of the impedance element and the second capacitor.

17. The power supply circuit as claimed in claim 11 wherein the second capacitor has a discharge path that includes the impedance element and the lamp connection terminals but not the first capacitor.

18. The power supply circuit as claimed in claim 11 wherein the current rectifier is polarized and connected in the power supply circuit so as to prevent the second capacitor from discharging into the first capacitor.

* * * * *